United States Patent [19]

Egbert

[11] 4,198,751
[45] Apr. 22, 1980

[54] SKINNING KNIFE

[76] Inventor: Lawrence E. Egbert, 20463 Schaefer, Detroit, Mich. 48235

[21] Appl. No.: 968,279

[22] Filed: Dec. 11, 1978

[51] Int. Cl.² .............................................. B26B 29/00
[52] U.S. Cl. ...................................... 30/286; 30/90.4; 30/294; 30/317
[58] Field of Search ...................... 30/90.4, 90.6, 317, 30/294, 286

[56] References Cited

U.S. PATENT DOCUMENTS

| 318,211 | 5/1885 | Seaman | 30/294 |
|---|---|---|---|
| 601,315 | 3/1898 | Creveling | 30/294 |
| 1,546,975 | 7/1925 | Feller | 30/286 |
| 3,092,903 | 6/1963 | Bockhold | 30/294 |
| 3,241,236 | 3/1966 | Capps | 30/287 |
| 3,600,806 | 8/1971 | Naccash | 30/294 |
| 3,605,268 | 9/1971 | Cassell | 30/294 |
| 3,673,687 | 7/1972 | Phillips et al. | 30/294 |
| 3,839,788 | 10/1974 | Addis | 30/287 |
| 3,906,561 | 9/1975 | Bawa | 30/90.4 |
| 3,918,158 | 11/1975 | Debski | 30/317 |

FOREIGN PATENT DOCUMENTS

| 163951 | 9/1949 | Austria | 30/317 |
|---|---|---|---|
| 1484635 | 5/1967 | France | 30/294 |
| 148888 | 2/1955 | Sweden | 30/317 |

Primary Examiner—Othell M. Simpson
Assistant Examiner—J. T. Zatarga
Attorney, Agent, or Firm—Charles W. Chandler

[57] ABSTRACT

A skinning knife having a notched cutting edge which opens toward the knife handle, and an enlargement on one side of the notch which permits the user to slice the hide of an animal without cutting the underlying flesh.

4 Claims, 8 Drawing Figures

U.S. Patent        Apr. 22, 1980        4,198,751
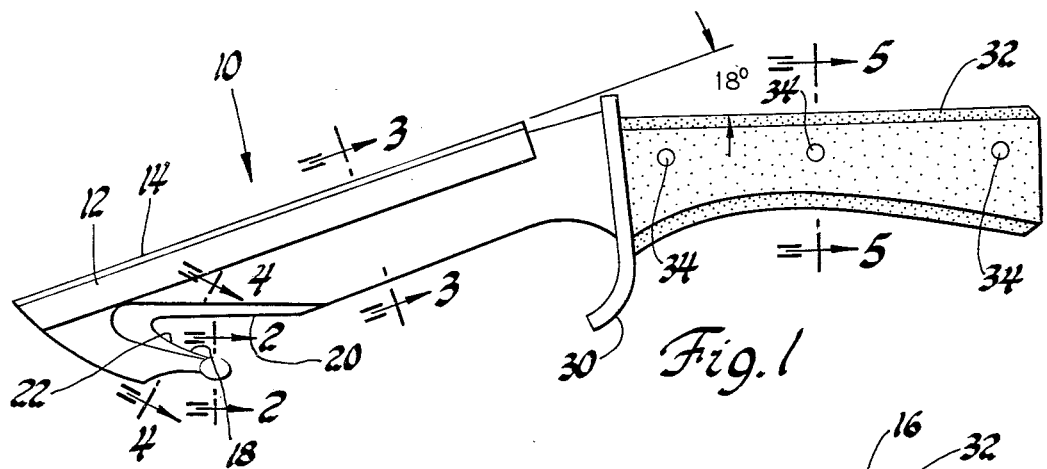
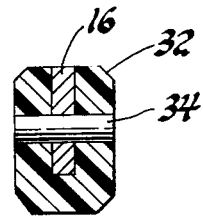
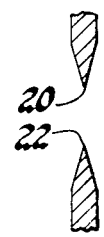
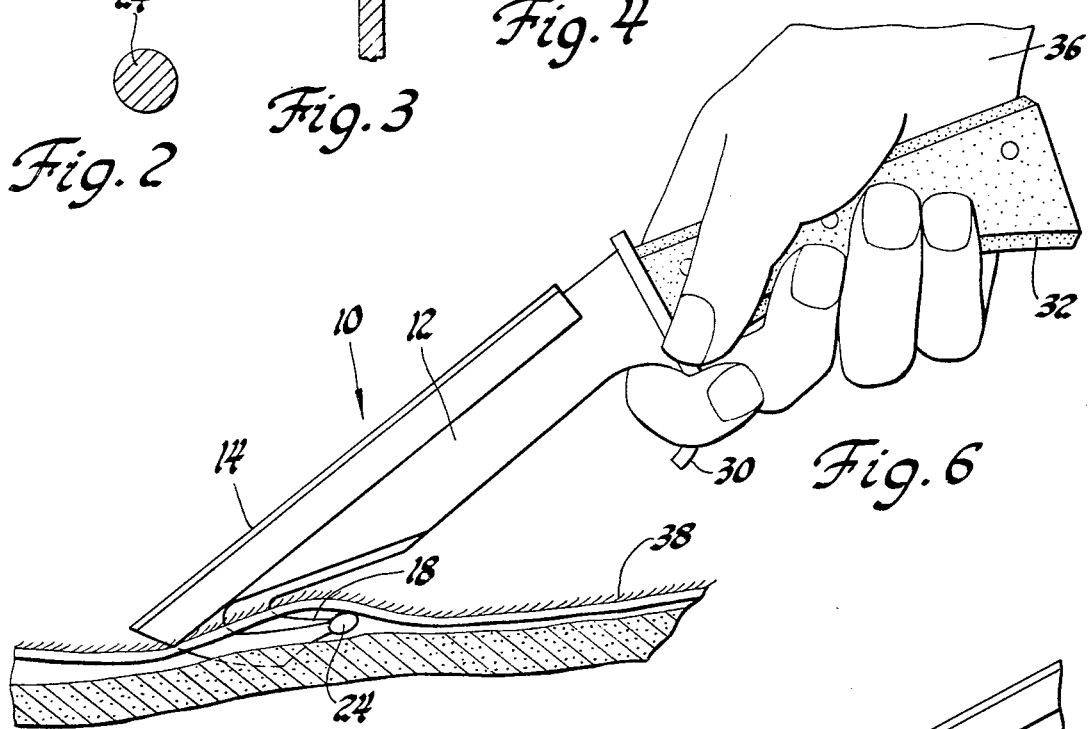
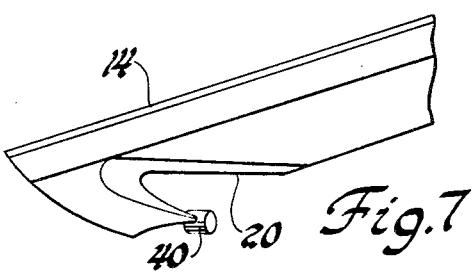
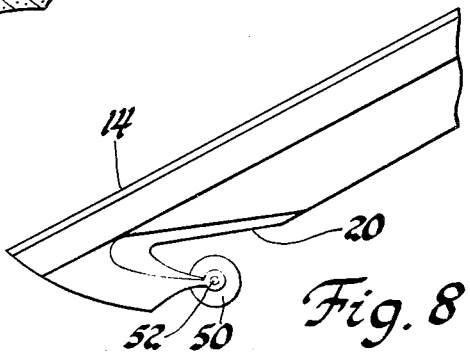

SKINNING KNIFE

BACKGROUND OF THE INVENTION

This invention is related to an animal and fish skinning knife having a notched cutting edge with a ball-shaped member adjacent the notch opening for guiding a skin onto the notch to be sliced as the user pulls the knife toward him in a cutting motion.

Skinning knives are commonly used by hunters for removing an animal skin from the flesh. It is usually desirable that the skin be removed to preserve the flesh and internal parts of the animal.

One device for cutting both the skin and flesh together to gain access into the body cavity was disclosed in U.S. Pat. No. 1,498,753 to Rendlich. The Rendlich knife has a hook with a ball-shaped tip forming a U-shaped curved cutting edge. The ball-shaped tip is inserted through an opening in the hide and brought into contact with the inner side of the carcass of hogs, calves, and other animals to assist in removing the insides thereof.

U.S. Pat. No. 1,546,975 which issued to Feller discloses a fish splitting knife having its tip shaped into a generally U-shaped cutting edge. The knife is drawn toward the user to sever the skin and flesh without mutilating the roe. I believe that neither of these prior art devices are popular among hunters or fishermen for separating the skin of an animal from the flesh. The shape of the curved blade does not provide an efficient slicing action.

SUMMARY OF THE INVENTION

The broad purpose of the present invention comprises an improved skinning device having a generally V-shaped notch located between the knife tip and the handle. One side of the notch has a lower cutting side with an enlargement, preferably with a ball-shaped element that is disposed between the animal hide and the flesh as the animal is being skinned. The opposite side of the notch is offset from the handle such that it is above the hide during a cutting motion. The cutting edge is disposed at a very slight angle with respect to the skin to provide a slicing action and thereby prevent tearing the skin. The user can either slice the skin with the V-shaped notch or reverse the knife to employ a straight cutting edge, thereby eliminating the necessity for two knives.

Still further objects and advantages of the present invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which:

FIG. 1 is a view of a preferred skinning knife;
FIG. 2 is a view taken along lines 2—2 of FIG. 1;
FIG. 3 is a view taken along lines 3—3 of FIG. 1;
FIG. 4 is a view taken along lines 4—4 of FIG. 1;
FIG. 5 is a view taken along lines 5—5 of FIG. 1;
FIG. 6 illustrates the manner in which the knife is employed for skinning an animal;
FIG. 7 illustrates another embodiment of the invention; and
FIG. 8 shows a still further embodiment of the invention.

DESCRIPTION OF THE PREFERRED EMBODIMENT

Referring to the drawing, a preferred skinning knife, generally indicated at 10, employs a blade 12, approximately five and half inches long with a linear hollow ground cutting edge 14 along one side of the blade. Blade 12 is preferably formed of a chromium steel to resist stains, rust, and to insure hardness and strength.

The blade has an elongated shank 16 preferably disposed at an angle of about 18° with respect to the cutting edge 14.

The opposite side of blade 12 has a cutting notch 18 which begins approximately one inch from the blade tip. Notch 18 opens in the direction of shank 16 and is defined by a generally linear upper cutting edge 20 and a lower, shorter cutting edge 22 which converges toward cutting edge 20 to form a generally V-shaped notch. Upper cutting edge 20 is parallel to shank 16. Cutting edge 20 is offset with respect to the shank a distance slightly greater than the shank width.

An enlargement 24, preferably in the shape of a ball, is mounted on the tip of shorter cutting edge 22. Although enlargement 24 has a ball-shaped configuration, it can take other shapes such as teardrop shape or a flat oval shape as long as it provides a rounded surface at the lower tip of the notch. Enlargement 24 functions as a guide for the cutting notch during a cutting motion.

A curved finger guard 30 is mounted between blade 12 and shank 16 on the same side of the blade as notch 18. Guard 30 not only provides protection for the user's hand, but enables him to obtain a better forefinger grasp when he is employing the knife in a skinning motion.

Referring to FIGS. 1 and 5, a hardwood handle 32, is mounted on shank 16. Rivet means 34 lock the handle to the shank.

Forming the shank and the handle at an angle of about 18° insures that the user has a sufficient hand clearance when slicing a skin with the notch. The user also has an excellent mechanical advantages as he pulls the knife in a cutting motion.

A V-shaped cutting edge has special advantages over a U-shaped cutting edge because the two sides compress the flesh or hide as it travels toward the apex of the two cutting edges providing better control, as well as an easier cutting motion.

FIG. 6 illustrates the manner in which the knife is employed by user 36 for slicing the hide 38 of an animal.

FIG. 7 shows a blade having a round T-bar cutting edge enlargement 40 rather than the ball or teardrop shape of FIG. 1.

FIG. 8 shows still another embodiment of the invention in which a small wheel 50, supported by axle means 52, is mounted on a tip of the notch.

Having described my invention, I claim:
1. A skinning knife, comprising:
  an elongated handle;
  an elongated metal blade having one end connected to the handle to form an obtuse angle therewith, the blade having a pair of side edges including an outer side edge and an inner side edge;
  the outer side edge of the blade being sharpened to form a cutting edge and terminating in a pointed end;

the inner side edge of the blade having a notch extending toward the outer side edge and opening in the direction away from said pointed end;

said notch having a pair of generally opposed edges including an upper notch edge generally parallel to the handle, a lower cutting notch edge terminating in a tip and a rounded sharpened corner connecting the upper notch edge and the lower notch edge.

2. A skinning knife as defined in claim 1, in which the upper notch edge is generally aligned with said pointed end.

3. A skinning knife as defined in claim 1, including a finger member mounted on the handle and curved toward the notch so as to be generally opposed to the rounded corner of the notch.

4. A skinning knife as defined in claim 1, in which the lower notch edge terminates in an enlarged tip disposed between the pointed end of the knife and the handle, said enlarged tip having an outside edge defining a bulge between said tip and said pointed end.

* * * * *